May 9, 1967           F. B. ROLFSON           3,318,138
OSMOMETER FOR USE WITH AQUEOUS SOLUTIONS
Filed Feb. 1, 1965
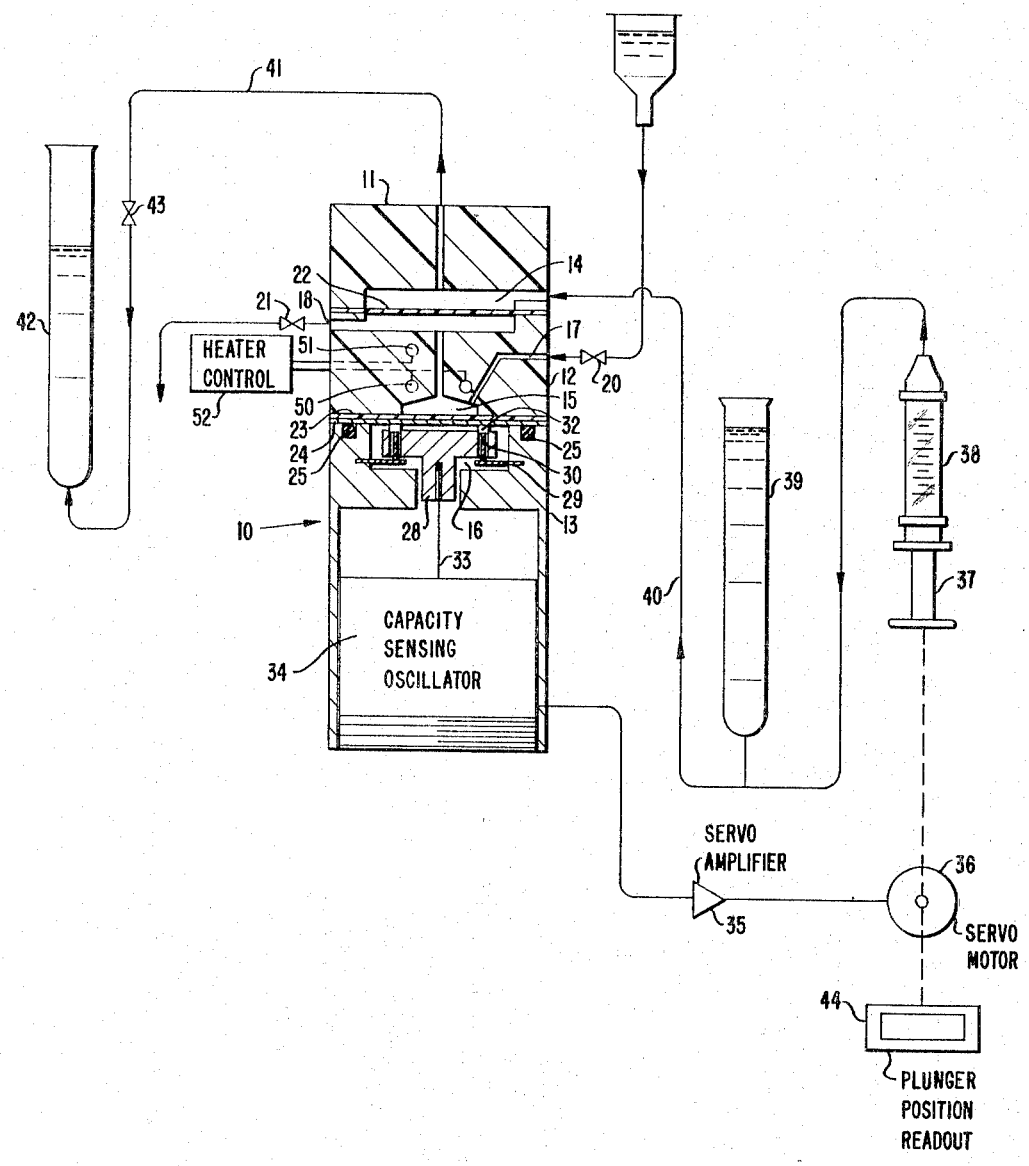
INVENTOR:
FRANCIS B. ROLFSON
BY:
HIS ATTORNEY

United States Patent Office 3,318,138
Patented May 9, 1967

3,318,138
OSMOMETER FOR USE WITH AQUEOUS SOLUTIONS
Francis B. Rolfson, San Pablo, Calif., assignor to Shell Oil Company, New York, N.Y., a corporation of Delaware
Filed Feb. 1, 1965, Ser. No. 429,541
6 Claims. (Cl. 73—64.3)

This application relates to osmometers and more particularly to osmometers for use with aqueous solutions.

In an osmometer, a solution sample of the material whose osmotic pressure is desired and a sample of the solvent in which the material is dissolved are placed in separate cells or chambers separated by a semi-permeable membrane, and the change in pressure in one of the cells as evidenced by a change in the volume of liquid in the cell due to osmotic flow through the membrane is detected as an indication of the osmotic pressure. Since the measurement is essentially a volume measurement, care must be taken to insure that the volume change of the cells and the liquid in the cells due to temperature changes are small as compared to the volume change caused by osmotic flow. Hence it is important that proper temperature control be provided for the osmometer.

In non-aqueous osmometers, the problem of volume change due to temperature change may be controlled by utilizing a constant temperature bath or other type of constant temperature control apparatus and a cell formed of a material having good thermal conductivity, such as a metal, so that it can be maintained at a constant temperature. Moreover, a solvent such as toluene which is highly expansive with temperature may be used. When using such a solvent, even though the change in volume which it is desired to detect actually depends on the differential expansion between the liquid or solvent and the cell cavity containing it, the high rate of expansion of the solvent compared to that of the metal cell allows the expansion of the metal to frequently be ignored.

In aqueous osmometry, however, obviously such solvents as toluene cannot be used; and, moreover the cell and parts of the instrument in contact with the solution cannot be made of metal in order to avoid contamination of the solution. Accordingly, for aqueous osmometry, the cell must be made of a material such as plastic in order to avoid contamination. The use of a plastic material for the cell member, however, appears to present a problem as to temperature control since, in view of the difficulty of obtaining adequate temperature control with a metal cell having excellent thermal conductivity, it is generally assumed that the problem of temperature control with a plastic cell having poor thermal conductivity is practically insurmountable. This assumption turns out to be unwarranted in view of the discovery that certain plastics, such as polycarbonate and Kel-F, have the same volume expansion with temperature as that of water, the solvent used in aqueous osmometry; and hence the differential expansion between the cell and the solvent due to temperature changes is effectively eliminated, and any detected volume or pressure change is representative of the osmotic pressure. Accordingly, instead of the temperature control problem with a plastic cell and an aqueous solution being insurmountable, it is in fact non-existent.

Although applicant's invention may be applied to any type of osmometer, a preferred embodiment of an osmometer suitable for use with applicant's invention is the automatic null seeking type of osmometer shown in my co-pending United States patent application Ser. No. 186,530, filed Apr. 10, 1962, now Patent No. 3,187,562. Such an osmometer for aqueous solutions, according to applicant's invention, is achieved by providing a sample cell having two chambers formed therein which is made of a plastic material having substantially the same change in volume with temperature change as water. The two chambers have a common side formed by the semi-permeable membrane through which the osmotic flow takes place. In addition, one of the chambers has a side wall formed by a thin diaphragm having on its exterior surface a metal film which forms one plate of a capacitor type pickup. The sample of the aqueous solution is injected into one of the chambers while the solvent for the substance to be measured, i.e., water, is injected in the other chamber. As the solvent flows through the membrane the pressure in the chamber is varied, thus deflecting the diaphragm and changing the capacitance of the capacitor. This change in capacitance is used to control a crystal oscillator whose output is coupled to a servo amplifier. The servo amplifier is used to drive a servomotor that controls the pressure of the solvent in the other chamber. Thus the system will increase or decrease the pressure of the solvent in the chamber until the capacitance is returned to its initial value. The final position of the servomotor will be related to pressure of the solvent that is the same as the osmotic pressure for zero osmotic flow through the diaphragm. This pressure can be measured either by measuring the position of the servomotor or utilizing the rotation of the servomotor to drive a suitable recording apparatus. Likewise, the pressure can be measured directly by means of pressure measuring devices, such as a manometer tube or the like, coupled to the solvent chamber. The instrument can be balanced and a zero position obtained by filling both chambers with solvent and equalizing the pressures in the two chambers. This will provide a zero position for the servomotor and a zero position reading on the pressure measuring device.

The invention will be more easily understood by those skilled in the art from the following description when taken in conjunction with the attached drawing which is a block diagram of the instrument with the sample cell shown in cross section.

Referring now to figure, there is shown a sample cell 10 formed from a sandwich of three members 11, 12 and 13. The members 11 and 12, according to the invention, are constructed of a plastic material having substantially the same volume rate of expansion with temperature as that of water. For example, two plastics which have this property and are extremely well suited for the desired purpose are polycarbonate and Kel-F. The upper member 11 has a circular depression formed therein to form a chamber 14. The center section 12 is provided with an inlet passage 17 and an outlet passage 18 that communicate with a central opening that forms a chamber 15. The bottom section 13, which is made of metal, is provided with a circular depression that forms a housing 16 for the capacitance pickup. The sample inlet line 17 is provided with a valve 20 while the outlet line 18 from the chamber 15 is provided with a valve 21. Thus, a sample solution of the substance whose osmotic pressure is to be determined and its solvent, which in the instant application is water, can be injected into the chamber 15 and isolated by closing the valves 20 and 21. It should be noted that in order not to contaminate the sample to be analyzed that the lines 17 and 18 and the valves 20 and 21, and in fact all the other inlet and outlet apparatus for the cell 10 which comes into contact with the sample and solvent, are formed of a material which does not contaminate the sample, e.g., plastic.

The upper or solvent chamber 14 is separated from the center or solution chamber 15 by means of a semi-permeable membrane 22 that is clamped between the mating surfaces of the members 11 and 12. The membrane 22 may be formed from any of the well-known materials suitable for aqueous osmometers. The center or solution chamber 15 is separated from the capacitor pickup housing 16 by a thin plastic diaphragm 23, preferably of the same material as the members 11 and 12, which is undercoated with a film 24 formed of a conducting material such as copper, brass or bronze. The diaphragm is sealed to the lower surface of the member 12 by means of an O-ring 25 and member 13 which contacts the metal film 24. The O-ring 25 should be of sufficient size to exert enough pressure on the diaphragm 23 to force it into sealing engagement with the lower surface of the member 12. The diaphragm 23 and the film 24 should be flexible and relatively thin, for example, .001 inch thick.

A relatively heavy metallic plate 28 is disposed adjacent the film 24 on the diaphragm 23 to form with the film 24 the two plates of a capacitor pickup. The plate 28 is forced into a fixed position with respect to the film 24 on diaphragm 23 by means of a plurality of circumferentially spaced springs 29 which react against the base of insulating members 30, e.g., nylon, and spacing members 32 to force the plate 28 upwardly to maintain the plate 28 in a fixed position relative to the film 24. The spacing members 32, which may be small sapphire jewels, are pressed into openings in the plate 28 and, preferably, provide a spacing between the metal film 24 and the plate 28 on the order of .003 inch. The capacitor formed by the film 24 and the plate 28 is coupled by means of the member 13 and lead 33, respectively, into the plate circuit of a crystal controlled oscillator 34 which preferably is mounted directly on the sample cell 10 by a continuation of the member 13 in order to insure that the system has a fixed capacitance in the absence of movement of the film 24. Any movement of the film 24 therefore produces a change in capacity in the plate circuit of the oscillator, resulting in a change in the plate current. This change in the oscillator plate current is detected by a servo amplifier 35 whose output is coupled to a servomotor 36. The particular details of the oscillator 24, amplifier 35 and servomotor 36 are shown in my above-mentioned copending patent application. The servomotor 36 is used to position a plunger 37 within a syringe 38 to inject solvent into or withdraw solvent from a manometer 39 which is coupled by a tube 40 to the chamber 14 formed in the member 11. Also coupled to the chamber 14 is a tube 41 which is connected to a solvent reservoir 42. The tube 41 is provided with a normally closed valve 43 which is only open when it is desired to change the solvent in the chamber 14 or to vary the level of the solvent in the system. Since, therefore, the pressure in chamber 14 is proportional to the level of the solvent in the manometer tube 39, the system, by injecting or withdrawing solvent from the manometer 39, adjusts the pressure within the chamber 14 to maintain the original spacing between the capacitor plates 23 and 30.

The servomotor 36 also drives a readout device 44 which may be a mechanical counting device that is geared to the servomotor to read directly the osmotic pressure. For example, the readout device 44, through suitable gearing, can be set to indicate, e.g., in cm., the change in the position of plunger 37 from the zero or balanced position. Since the position of the plunger 37 is proportional to the level of solvent in the manometer tube 39 and hence the pressure in the chamber 14, the amount of movement of the plunger from the zero to the equilibrium position is a direct indication of the osmotic pressure. Likewise, the servomotor can be used to drive a potentiometer whose signal is recorded on a chart recorder or the like. In addition to the readout device 44, the height of the solvent in the manometer tube 39 may be used to provide a visual indication of the pressure within the chamber 14.

In order to insure uniform temperatures within the sample cell two heating elements 50 are disposed within cavities formed in the member 12. The power supplied to heating element 50 is controlled by controller 52 that utilizes the temperature sensed by a resistance thermometer 51. This type of thermo regulating system is more particularly described and claimed in U.S. Patent No. 2,838,644, which was issued June 10, 1958, to F. B. Rolfson et al.

The operation of the above system will now be described with reference to the figure. The zero position of the instrument can be determined as explained above by introducing solvent into both the solvent chamber 14 and the solution chamber 15. The oscillator 34, servo amplifier 35 and servomotor 36 can then be energized from the power supply and the instrument permitted to operate until it reaches an equilibrium position. Although the above-described method of zeroing the instrument operates satisfactorily, it should be noted that the zero point of the instrument will vary in accordance with the original height of the solvent in the manometer 39. In view of this fact, when determining the osmotic pressure of a sample after zeroing by this method, a difference reading between the zero point and the final point must at all times be taken in order to determine the pressure difference. In order, therefore, to obtain a direct reading of the pressure difference, the height of the solvent in the manometer 39 is initially adjusted to the same level as the diaphragm. As can easily be appreciated with both chambers of the cell filled with solvent and the level of the solvent in the manometer being as indicated, the pressures above and below the diaphragm 23 are equal; and hence a true zero point for the instrument exists, thus enabling direct reading of the change in pressure.

After the instrument is zeroed, the solvent is flushed from the solution chamber 15 and the sample solution of the substance to be measured dissolved in the solvent, i.e., water, introduced and isolated therein by closing the valves 20 and 21. The solvent from the chamber 14 then passes through the semi-permeable membrane 22 into the solution chamber 15. This causes an increase in the pressure in chamber 15 and deflects the diaphragm 23 and the film 24. The deflection of the film 24 causes a decrease in the capacitance of the capacitor pickup formed by the film 24 and the plate 30. This decrease in the capacitance also decreases the capacitance in the plate circuit of the oscillator 34, resulting in a rapid fall in the plate current of the oscillator and causing the servo amplifier 35 to operate and energize the servomotor 36. The servomotor 36 will then rotate in a direction to withdraw the plunger 37 from the syringe 38, thereby decreasing the pressure of the solvent in the chamber 14 and reducing the flow of solvent through the semi-permeable member 26. This opertion continues, for about 3–5 minutes, until an equilibrium is reached where no further solvent flow through the membrane 22 takes place. When equilibrium is reached the pressure within the chamber 14 is related to the osmotic pressure of the sample; and this pressure is, of course, related to the position of the plunger 37 within the syringe 38. The plunger position, and thereby the change in pressure which is the osmotic pressure of this solution, can be determined from the readout device 44 or, as explained above, the rotation of the servomotor 36 can be used to drive a potentiometer whose output signal is coupled to a chart recording device.

It should be noted that if at any time the pressure in the chamber 15 is less than the pressure in chamber 15 the servomotor is energized to rotate in the reverse direction to increase the pressure in the chamber 15 until equilibrium is obtained.

Obviously, various modifications of the invention are possible in the light of the above teachings. For example, while the invention has been described with the upper and lower chambers 14 and 15 being the solution and solvent chambers, respectively, it is understood that, if desired, the function of the two chambers may be reversed, i.e., the solution may be introduced into the lower chamber and the solvent into the upper chamber. It is therefore to be understood that the invention is not limited to the particular form illustrated but is capable of embodiment in other forms within the scope of the appended claims.

I claim as my invention:

1. An osmometer for use with aqueous solutions comprising:
   a cell member formed of a plastic material having substantially the same volume expansion with temperature as water, said cell member having first and second chambers formed therein with said chambers having a common wall formed by a semi-permeable membrane, one of said chambers containing an aqueous solution sample of the material whose osmotic pressure is to be determined and the other of said chambers containing the solvent in which said material is dissolved;
   pressure sensing means disposed to measure the pressure in said first chamber; and
   means responsive to the measured pressure for producing an indication related to the osmotic pressure of said material.

2. The apparatus of claim 1 wherein said cell is made of polycarbonate.

3. The apparatus of claim 1 wherein said cell is made of Kel-F.

4. The apparatus of claim 1 wherein said means responsive to he measured pressure includes:
   a pressure control means, said pressure control means being disposed to adjust the pressure in the one of said chambers containing the solvent, said pressure control means being conpled to said pressure sensing means and responsive to signals therefrom to equalize the pressures in said first and second chambers; and,
   recording means coupled to said pressure control means to record the position thereof as an indication of the osmotic pressure of the material.

5. An osmometer for use with aqueous solutions comprising:
   a cell member formed of a plastic material having a volume expansion with temperature substantially the same as that of water;
   said cell member having first chamber therein, one wall of said first chamber being formed by a semi-permeable membrane and a second wall of said first chamber being formed by a flexible plastic diaphragm;
   a second chamber formed in said cell and having one wall formed by said membrane, one of said chambers containing an aqueous solution sample of the material whose osmotic pressure is desired, and the other of said chambers containing the solvent in which said material is dissolved;
   a metal film formed on the exterior surface of said diaphragm;
   a capacitance plate disposed on the outside of said first chamber adjacent said metal film, said plate and said film forming a capacitor;
   means for adjusting the pressure in the one of said chambers containing said solvent;
   a servo system coupled to said pressure adjusting means, said servo system being responsive to the variations in said capacitor caused by the deflection of said metal film to balance the pressure of both sides of said semi-permeable membrane; and,
   means coupled to said servo system for producing an indication of the change in pressure necessary to produce the pressure balance as a measure of the osmotic pressure of the material.

6. In an osmometer for the determination of the osmotic pressure of aqueous solutions, wherein said osmometer comprises a cell having a pair of chambers separated by a semi-permeable membrane, and means for determining the pressure in one of said chambers; and wherein one of said chambers contains the aqueous solution whose osmotic pressure is to be determined and said other chamber contains the solvent for said solution, the improvement comprising: constructing said cell from a plastic material having substantially the same volume expansion with temperature as that of water.

References Cited by the Examiner

UNITED STATES PATENTS 3,195,346    7/1965    Ehrmantraut et al. _____ 73—64.3

LOUIS R. PRINCE, *Primary Examiner.*

D. O. WOODIEL, *Assistant Examiner.*